(12) United States Patent
Wu et al.

(10) Patent No.: US 9,805,027 B2
(45) Date of Patent: Oct. 31, 2017

(54) TRANSLATING APPLICATION RESOURCES

(71) Applicant: GOOGLE INC., Mountain View, CA (US)

(72) Inventors: Genqing Wu, Beijing (CN); Hanping Feng, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/714,041

(22) Filed: May 15, 2015

(65) Prior Publication Data
US 2015/0324353 A1 Nov. 12, 2015

Related U.S. Application Data

(63) Continuation of application No. 14/375,855, filed as application No. PCT/CN2012/000142 on Feb. 3, 2012, now abandoned.

(51) Int. Cl.
*G06F 17/28* (2006.01)
*G06F 17/27* (2006.01)

(52) U.S. Cl.
CPC .......... *G06F 17/289* (2013.01); *G06F 17/275* (2013.01)

(58) Field of Classification Search
USPC ....................................................... 704/1–10
See application file for complete search history.

(56) References Cited

U.S. PATENT DOCUMENTS

| | | | | |
|---|---|---|---|---|
| 5,917,484 A * | 6/1999 | Mullaney | ................ | G06F 17/27 704/8 |
| 6,526,426 B1 * | 2/2003 | Lakritz | ............... | G06F 17/2258 704/8 |
| 7,729,900 B2 * | 6/2010 | Moore | .................. | G06F 9/4448 704/8 |
| 8,027,438 B2 * | 9/2011 | Daigle | .................. | G06F 17/275 379/88.06 |
| 2005/0050526 A1 | 3/2005 | Dahne-Steuber et al. | | |
| 2005/0251562 A1 | 11/2005 | Hauduc et al. | | |
| 2006/0117304 A1 | 6/2006 | Anastassopoulos et al. | | |
| 2006/0271352 A1 * | 11/2006 | Nikitin | .................. | G06F 17/289 704/9 |
| 2006/0294463 A1 | 12/2006 | Chu et al. | | |

(Continued)

FOREIGN PATENT DOCUMENTS

| | | |
|---|---|---|
| CN | 1474312 A | 2/2004 |
| CN | 1928813 A | 3/2007 |

OTHER PUBLICATIONS

Extended European Search Report for International Application No. 12867194.8, dated Sep. 30, 2015. 36 Pages, 36 Pages.

(Continued)

*Primary Examiner* — Abul Azad
(74) *Attorney, Agent, or Firm* — Morris & Kamlay LLP

(57) ABSTRACT

According to one general aspect a system includes an identification module, a translation module, and a display module. The identification module being configured to identify when an application running within the system attempts to display a work to a user of the application in a first language. The translation module being configured to translate the word from the first language to a second language different than the first language. The display module being configured to display the word in the second language to the user.

24 Claims, 10 Drawing Sheets

(56) References Cited

U.S. PATENT DOCUMENTS

2010/0088695 A1    4/2010    Kakinari et al.
2012/0022851 A1    1/2012    Bremner et al.

OTHER PUBLICATIONS

ISR and Written Opinion for PCT/CN2012/000142 dated Nov. 8, 2012.
Chinese Office Action dated Jul. 27, 2016 issued in Chinese Application No. 201280069010.X.
Office Action dated Feb. 14, 2017 as received in CN Application No. 201280069010.X.
Office Action dated Mar. 21, 2017 as received in EP Application No. 12867194.8.
Office Action dated Jul. 4, 2017 as received in CN Application No. 201280069010.X.
Letter reporting the Office Action dated Jul. 4, 2017 as received in CN Application No. 201280069010.X.

\* cited by examiner

TRANSLATING APPLICATION RESOURCES

TECHNICAL FIELD

This disclosure relates generally to the translation of computer applications.

BACKGROUND

Many computer applications or computer programs are commercially available to users. For example, many people own mobile devices, such as smartphones, that are able to run computer applications.

Many of the computer applications or computer programs, however, are not available in more than a few languages. For example, many computer applications or computer programs are only available in the native language of the developer of a particular program. Accordingly, not all computer applications or computer programs are readily usable by all people. For example, a computer program or computer application that required the use of or interacted with a user in only English might not be usable by a person who does not understand English.

Accordingly, there is a need to provide a system that translates computer applications for use of the applications by users of different languages.

SUMMARY

According to one general aspect, a system includes an identification module, a translation module, and a display module. The identification module being configured to identify when an application running within the system attempts to display a word to a user of the application in a first language. The translation module being configured to translate the word from the first language to a second language different than the first language. The display module being configured to display the work in the second language to the user.

According to another general aspect, a method includes (1) identifying when an application attempts to display a word to a user of the application, the word being in a first language: (2) translating the word attempted to be displayed to the user from the first language to a second language, the second language being different than the first language; and (3) displaying the word in the second language to the user.

According to another general aspect, a computer program product, the computer program product is tangibly embodied on a computer-readable medium and includes instructions that, when executed, are configured to cause at least one processor to (1) identify when an application attempts to display a word to a user of the application, the word being in a first language; (2) translate the word attempted to be displayed to the user from the first language to a second language, the second language being different than the first language: and (3) display the word in the second language to the user. According to another general aspect, a method performed by a computing device having at least one processor and a memory, includes receiving, from an application being executed by the at least one processor, a request to provide a first word for use by the application, wherein: the application is published by an entity, and the application is associated with one or more resources that are stored in the memory of the computing device and that are published by the entity; determining a default language of the computing device; accessing, in the memory of the computing device, the one or more resources: determining if the one or more resources include the first word in the default language; if the one or more resources include the first word in the default language, then providing the first word to the application; and if the one or more resources do not include the first word in the default language, then: transmitting the first word and an indication of the default language to a translation server, receiving from the translation server a second word obtained by translating the first word into the default language; and providing the second word to the application.

According to another general aspect, a computing device having at least one processor and a memory includes a receiving module configured to receive a request from an application to provide a first word for use by the application, the application being published by an entity and being associated with one or more resources that are stored in the memory of the computing device and that are published by the entity; a first determination module configured to determine a default language of the computing device; an accessing module configured to access the one or more resources; a second determination module configured to determine if the one or more resources include the first word in the default language; and a transmitting module, the display module configured to transmit the first word in the default language to the application if the one or more resources include the first word in the default language, the transmitting module configured to transmit the first word and an indication of the default language to a translation server, receive from the translation server a second word obtained by translating the first word into the default language, and transmit the second word to the application.

According to another general aspect, a computer program product is tangibly embodied on a computer readable medium and comprising instructions that, if executed, cause at least one processor of a computing device to receive, from an application being executed by the at least one processor, a request to provide a first word for use by the application, wherein: the application is published by an entity, and the application is associated with one or more resources that are stored in a memory of the computing device and that are published by the entity; determine a default language of the computing device; access, in the memory of the computing device, the one or more resources; determine if the one or more resources include the first word in the default language; if the one or more resources include the first word in the default language, then provide the first word to the application; and if the one or more resources do not include the first word in the default language, then: transmit the first word and an indication of the default language to a translation server; receive from the translation server a second word obtained by translating the first word into the default language; and provide the second word to the application.

According to another general aspect, a method is performed by a computing device. The method includes identifying, by the computing device, a preferred language of an application executing on the computing device, wherein the application utilizes a word; accessing one or more resources of the application; determining that the one or more resources do not include the word in the preferred language; and transmitting the word and an indication of the preferred language to a computing system.

According to another general aspect, a computing device, includes an identification module configured to identify a preferred language of an application executing on the computing device, wherein the application utilizes a word; an accessing module configured to access one or more resources of the application; a determination module configured to determine that the one or more resources do not include the word in the preferred language; and a transmitting module configured to transmit the word and an indication of the preferred language to a computing system.

According to another general aspect, a computer program product tangibly embodied on a computer readable medium and comprising instructions that, if executed, cause at least one processor of a computing device to identify a preferred language of an application executing on the computing device, wherein the application utilizes a word: access one or more resources of the application: determine that the one or more resources do not include the word in the preferred language; and transmit the word and an indication of the preferred language to a computing system.

According to another general aspect, a method is performed by a computing device. The method includes receiving an application to be run on a computing device from a first entity, the application including at least one resource that includes a word in a first language; receiving a request from a second entity to download the application, the second entity having a preferred language, the preferred language being different than the first language; and translating the word from the first language to the preferred language.

The details of one or more implementations are set forth in the accompanying drawings and the description below. Other features will be apparent from the description and drawings, and from the claims.

DETAILED DESCRIPTION

Figure 1:
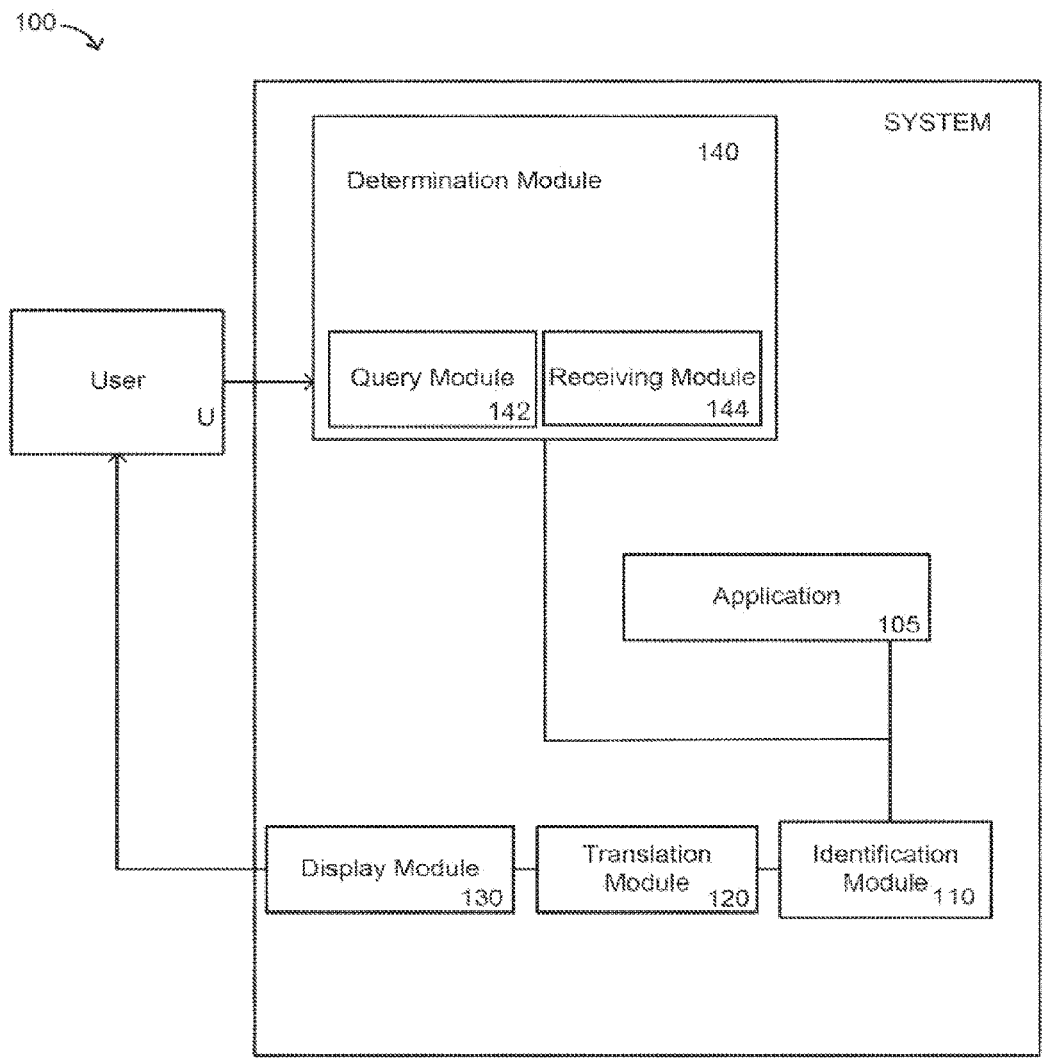
FIG. 1 is a block diagram of a system for translating information provided by an application according to an implementation.

FIG. 1 is a block diagram of a system 100 for translating information provided by an application according to an implementation. The system 100 may be used by users or consumers to run or execute programs or applications. For example, the system 100 may be or may be incorporated into a computing device such as a handheld computing device or a personal computer.

In some implementations, application and computer program developers may develop applications or computer programs for running or executing on or within the system 100. In some implementations, the applications or computer programs are configured to communicate via a written language or written words with users of the applications or computer programs. In some implementations, the system 100 is configured to translate the words that an application or computer program attempts to provide to a user.

The system 100 includes an identification module 110, a translation module 120, a display module 130, and a determination module 140. In some implementations, one or more of the components or modules of the system 100 or other systems or computing devices disclosed herein can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed by a computer). For example, in some implementations, the identification module 110 can be, or can include, a software module configured for execution by at least one processor (not shown). Similarly, the translation module 120 can be, or can include, a software module configured for execution by at least one processor (not shown). In some implementations, the functionality of the modules or components can be included in different modules and/or components than those shown in FIG. 1. For example, although not shown, the functionality of the identification module 110 can be included in a different module than the identification module 110, or can be divided into several different modules.

The identification module 110 is operatively coupled to the application 105 and to the determination module 140. The identification module 110 is configured to identify when the application is attempting to communicate with the user in a language other than a language that is understood or preferred by the user. For example, if the user prefers to communicate in Japanese and the application 105 is attempting to display words in English to the user, the identification module would identify such inconsistency or difference.

The translation module 120 is operatively coupled to the identification module 110. The translation module 120 is configured to translate words or words that the application 105 is attempting to display to the user U. For example, in some implementations, the translation module 130 is configured to translate the word or words into a number of different languages (such as Chinese, Japanese, German, Spanish, etc.).

In some implementations, the translation module 120 includes software configured to translate the word or words. In other implementations, the translation module 120 is configured to communicate with a third-party (such as via a network) to request or otherwise acquire a translation of the word or words.

The translation module 120 is operatively coupled to the display module 130. The display module 130 is configured to provide an output to the user U. For example, in some implementations, the display module 130 is configured to provide a visual output to the user U, such as via a display screen. In some implementations, the display module 130 is configured to output the word or words that have been translated by the translation module 120.

The determination module 140 is configured to determine a preferred language of the user U. For example, in some implementations, the determination module 140 is configured to determine the native language of a user U. In some implementations, the determination module 140 is configured to determine the preferred language of the user by determining the location (such as the country) of the user and basing the preferred language determination on the language used that location or country. In some implementations, the determination module 140 is configured to determine the preferred language of the user U based on setting of the device, system, or application as set by the user U.

In some implementations, the determination module 140 includes a query module 142 and a receiving module 144. The query module 142 is configured to provide a query to the user. In some implementations, the query requests that the user U provide an indication of the preferred language of the user U. In such implementations, the receiving module 144 is configured to receive the response to the query as provided by the user U.

In some implementations, the operating system or platform of the device or system 100 is configured to recognize or identify when a program or application is communicating with the user using written words. For example, in some implementations, the operating system is configured to recognize when a program or application 105 is attempting to provide a menu or other user interface item to the user. The operating system or platform may then be configured to identify the language of the menu or other user interface item and may provide a translated menu or other user interface item to the application (for providing to the user) or directly to the user. In some implementations, the operating system or platform is configured to communicate with a third party translation service to acquire the necessary translations of the menus or other user interface items. In other implementations, the operating system or platform may itself be configured to translate the menu or other user interface items.

In other implementations, the program or application 105 may be configured to provide a request to the operating system or to the platform to provide a translation of menu or other user interface items.

In other implementations, a secondary program or application may be active and may be configured to identify or recognize when a primary program or application is attempting to communicate with the user of the device using written words. In such implementations, the secondary program or application may be configured to interrupt the communication between the primary program and the user. The secondary program may then communicate with a third party translation service to acquire any necessary translation or may provide the translation function. The secondary application may then provide the translated menus or other user interface items to the primary program or application 105 (for providing to the user) or may provide the translations directly to the user.

Figure 2:
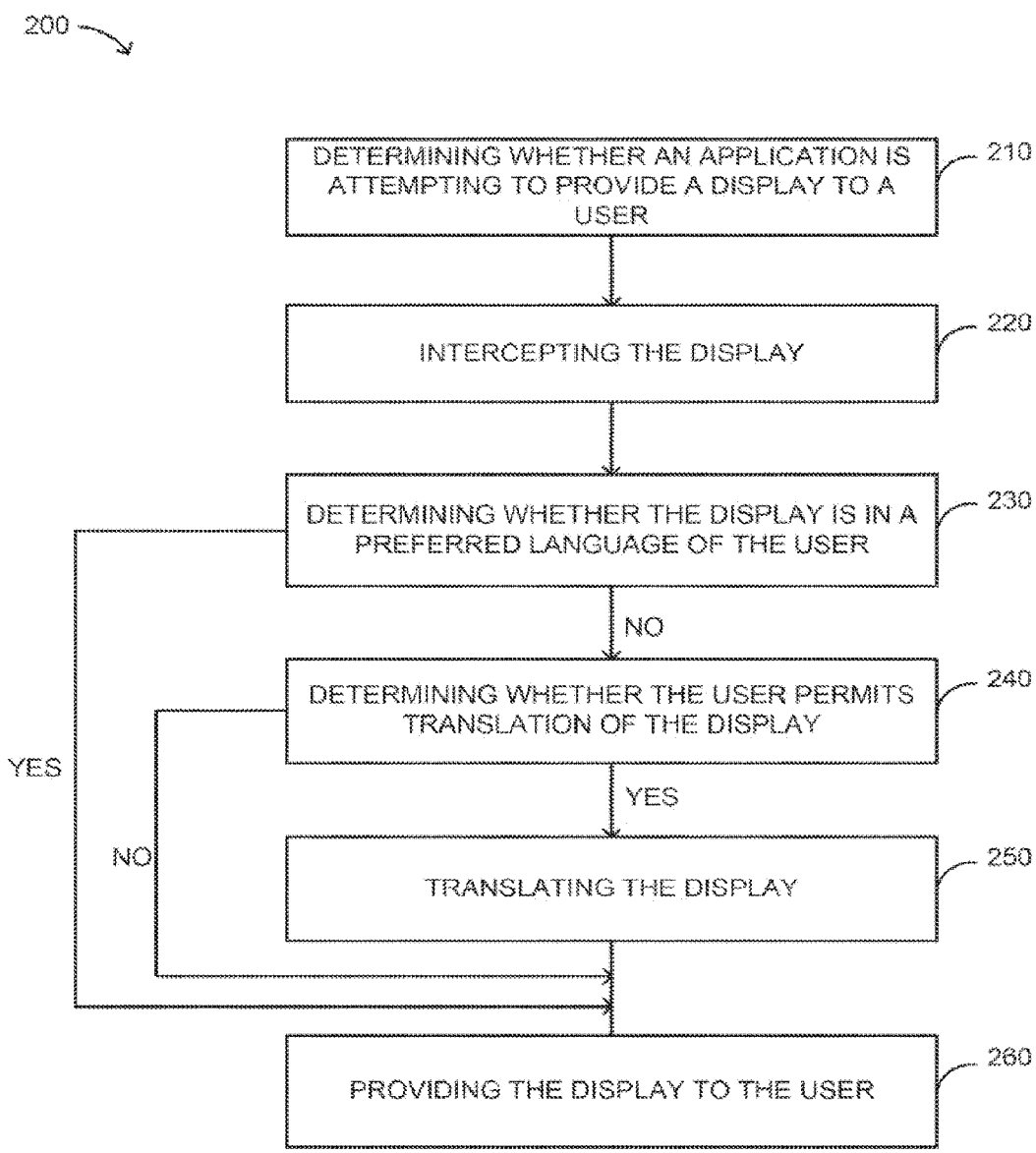
FIG. 2 is a flowchart illustrating example operations of a computer program product according to an implementation.

FIG. 2 is a flow chart illustrating a method 200 according to an implementation. In some implementations, the method 200 allows users of an application or computer program to communicate or interact with the application or computer program in a preferred language of the user. For example, if an application or a computer program is attempting to communicate with the user via a display that would include a word or words in a language that is not preferred by the user or a native language of the user, the method 200 may be used to translate such word or words to a language that is preferred by the user prior to displaying the word or words to the user.

In some implementations, a computer program product is tangibly embodied on a computer-readable medium and includes instructions that, when executed, are configured to cause at least one processor to implement the method 200.

At 210, a determination is made as to whether an application or computer program product is attempting to provide a display to a user. For example, at 210, the method identifies when an application or computer program product is attempting to provide a display that includes a word or a set of words to a user. For example, at 210, the method identifies the application if the application or computer program is attempting to communicate or interact with a user by providing a query to the user or if the application or computer program product is providing verbal instructions or information to the user.

At 220, the application or computer program product is prevented from providing the display to the user. For example, in some implementations, the application or computer program product is interrupted. Specifically, in some implementations, the system of the device (such as a handheld device or a personal computer) of the user or another application or computer program may interrupt or intercept the attempt by the application or computer program product to provide a display to the user.

At 230, a determination is made as to whether the language of the word or words that the application is attempting to display to the user is in a preferred language of the user. For example, a determination may be made as to whether the language of the word or words is the native language of the user. In some implementations, a publicly available resource may be used to determine the language of the word or words.

If the word or words of the display are not in the language of the user, then at 240, it is determined whether the user allows for the translation of the word or words. If the user does allow for the translation of the search results, then at 250, the word or words are translated and at 260, the translated display (with the translated word or words) is provided to the user. If the user does not allow for the translation of the word or words, then the translation is not performed and the word or words in the original language are provided to the user.

In some implementations, a user may adjust or set a setting to indicate whether the user desires or allows for the translation of the search results. Additionally, in some implementations, the user may provide an indication of a preferred language of the user. In other implementations, a prompt or request may be provided to the user to allow the user to indicate whether the user desires that the search results be translated.

Figure 3:
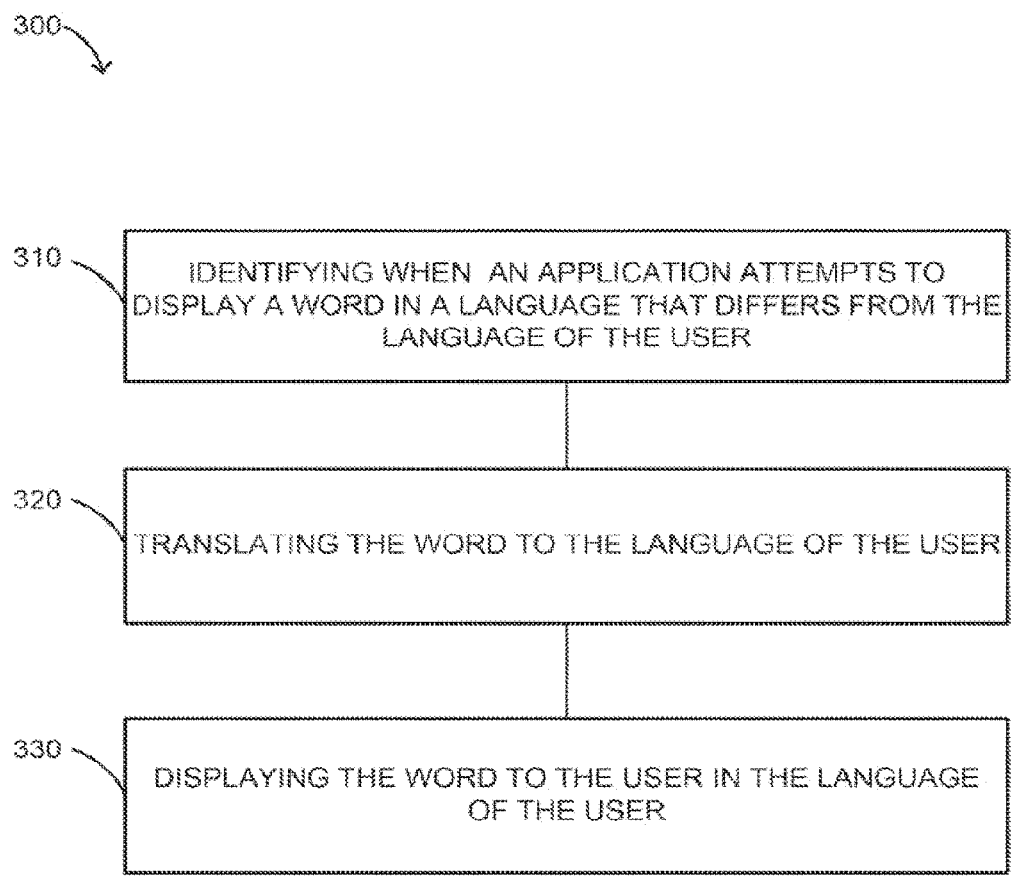
FIG. 3 is a flowchart illustrating example operations of a computer program product according to an implementation.
Figure 4:
FIG. 4 is a screen shot of an application displaying a user interface.

FIG. 3 is a flow chart illustrating a method 300 according to an implementation. In some implementations, the method 300 allows users of an application or computer program to communicate or interact with the application or computer program in a preferred language of the user of the device. FIG. 4 illustrates a screen shot of an application that provides words or communicates with the user of the device in multiple languages (which may not be understood by the user of the device). For example, if an application or a computer program is attempting to communicate with the user via a display that would include a word or words in a language that is not preferred or understood by the user or a native language of the user, the method 300 may be used to translate such word or words to a language that is preferred by the user prior to displaying the word or words to the user.

In some implementations, a computer program product that is tangibly embodied on a computer-readable medium and includes instructions, that when executed, are configured to cause at least one processor to implement the method 300.

At 310, the method includes identifying when an application or a computer program is attempting to provide a display to a user that includes a word that is in a language that differs from a preferred or native language of the user. In some implementations, a publicly available resource, such as a resource available via the Internet, is used to determine the language of the word or words that the application or computer program is attempting to display to the user.

In some implementations, the operating system or platform of the device is configured to recognize or identify when a program or application is communicating with the user using written words. For example, in some implementations, the operating system is configured to recognize when a program or application is attempting to provide a menu or other user interface item to the user. The operating system or platform may then be configured to identify the language of the menu or other user interface item and may provide a translated menu or other user interface item to the application (for providing to the user) or directly to the user. In some implementations, the operating system or platform is configured to communicate with a third party translation service to acquire the necessary translations of the menus or other user interface items. In other implementations, the operating system or platform may itself be configured to translate the menu or other user interface items.

In other implementations, the program or application may be configured to provide a request to the operating system or to the platform to provide a translation of menu or other user interface items.

In other implementations, a secondary program or application may be active and may be configured to identify or recognize when a primary program or application is attempting to communicate with the user of the device using written words. In such implementations, the secondary program or application may be configured to interrupt the communication between the primary program and the user. The secondary program may then communicate with a third party translation service to acquire any necessary translation or may provide the translation function. The secondary application may then provide the translated menus or other user interface items to the primary program or application (for providing to the user) or may provide the translations directly to the user.

In some implementations, the user provides an indication of the preferred language of the user. For example, in some implementations, the method 300 includes requesting the user for an indication of the preferred language. In some implementations, the preferred language is the native language of the user.

In some implementations, the application or computer program is interrupted from providing the display with the word in its original language to the user. For example, in some implementations an operating system or other program of the device of the user interrupts the application or computer program from providing the display with the word in its original language to the user.

At 320, the word of the display that is not in the preferred language of the user is translated. For example, if the preferred language of the user is Chinese and the original language of the word is English, the word would be translated to Chinese. In some implementations, a publicly available translation service may be used to translate the word. For example, a translation service available via the Internet may be used to translate the word to the preferred language of the user. At 330, the display including the translated word is provided to the user.

Figure 5:
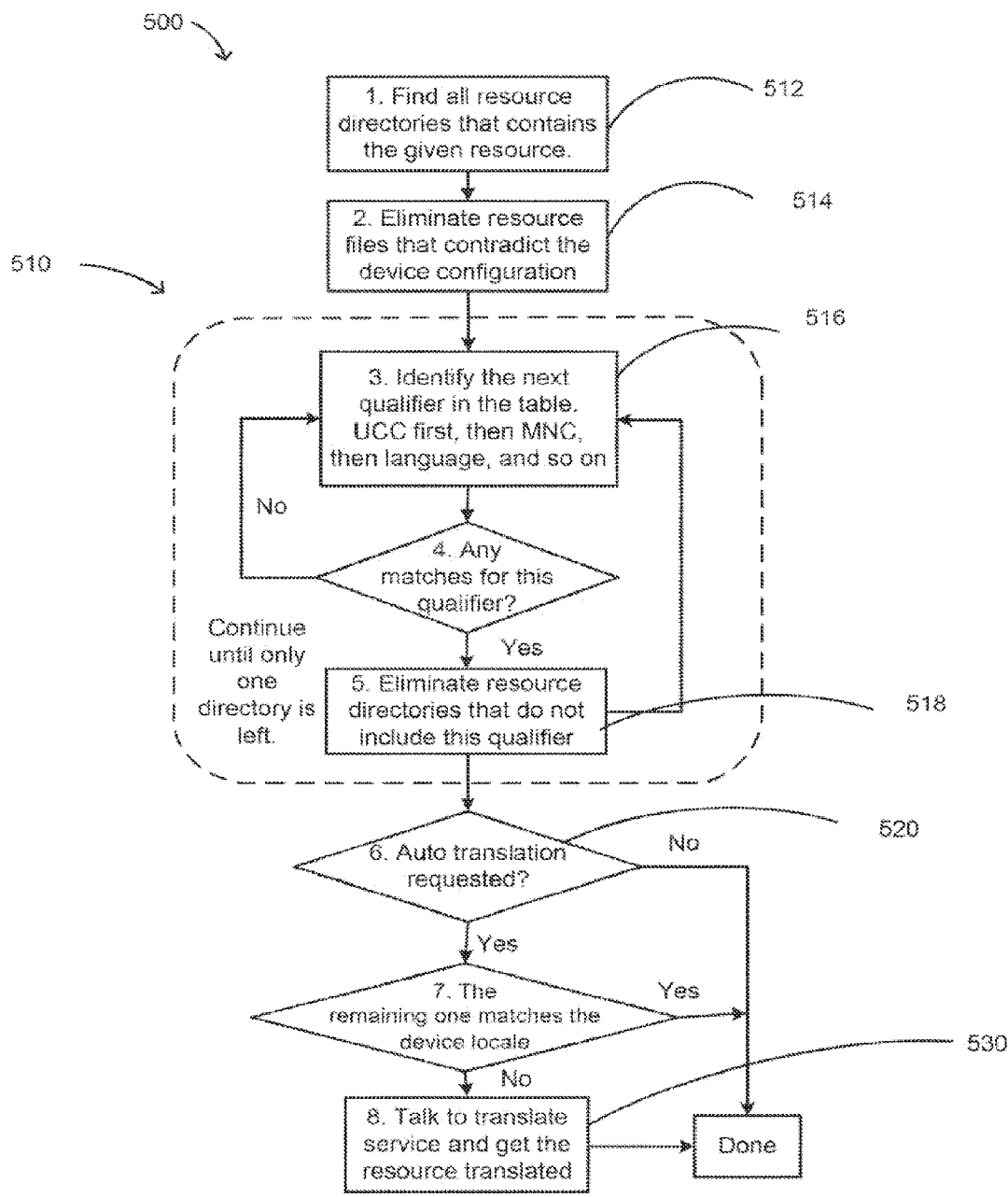
FIG. 5 is a flow chart illustrating a method for displaying text of an application or computer program according to an implementation.

FIG. 5 is a flow chart for a method 500 for displaying text of an application or computer program, such as a menu, in a different language according to an implementation. In this example, resource-based text strings many be translated and displayed to the user of the device.

For example, in some implementations, the following is an implementation of a menu item and the display of such menu item.

```
@Override
public boolean onCreateOptionsMenu (final Menu menu) {
    final boolean result = super.onCreateOptionsMenu(menu);
    String menuTitle = getString (R.string.menu_title);
    MenuItem item = menu.add (menuTitle);
    return result && item != null;
```

Additionally, the string resource directories that contain R.string.menu_title may be as below.

```
values/string.xml
values-mcc232-de/strings.xml
values-en/string.xml
values-fr-rCA/string.xml
values-en-port/string.xml
values-en-notouch-12key/string.xml
```

The method 500 may be used to display the menu in a preferred language of the user of the device. In the illustrated implementation, at 510 the local resource, such as values/string.xml, is determined. Specifically, at 512, all of the resource directories for the given resource are located. At 514, the resource files that contradict the device configuration are eliminated. At 516, qualifiers are identified. At 518, resource directories that do not include the specified qualifier are eliminated. Items 516 and 518 are repeated until only one directory remains, such as values/string.xml.

At 520, the platform of the device may determine or detect whether auto translation has been requested. If it has not, the process is completed. If auto translation has been requested, then at 530, it is determined or detected whether the language of the local resource is the same as the user's preferred language. If it is, then the process is done. If it is not, then at 540, a translation service may be used to translate the resource. For example, the translation service may be used to translate the string of the resource (which is in any language) to the preferred language of the user (any other language).

In some implementations, the translation service may be a program run on the device itself or a device may communicate with a third party translation service, such as a translation service accessible via the Internet.

In some implementations, the device is configured to identify or detect the preferred language of the user. For example, in some implementations, the user may be requested to provide a preferred language. In other implementations, the device is configured to detect to the location or locale of the user and selects the language of the location or locale of the user as the user's preferred language.

In some implementations, the application programming interface (API) may be changed or modified to support the method of 500. For example, the API may be modified as follows.

```
"String getString(int resourceId)" can be modified to "String
getString(int resourceId, boolean autoTranslateWhenNeeded)"
```

Accordingly, from the example above, "String menuTitle=getString (R.string.mcnu_title)" can be modified to be "String menuTitle=getString(R.string.menu_title, true)."

In some implementations, the text strings or resources identify a language. For example, in some implementations the text strings or resources identify the language of the text string. In other implementations, the device, application, or program includes an identifier that is configured to identify the default language of the text strings.

In some implementations, the application or program includes a cache of language translations for the text strings of the application. In such implementations, the translated text string may be looked up or identified rather than performing a new translation of the text string.

In some implementations, the application or the platform of the device includes an option to enable or disable the auto translate feature. In such implementations, the user may determine whether the application or program should provide the translated text strings.

In some implementations, the developer of the application or program can specify a target language or more than one target languages. The resources and text strings can then all be translated into all of the target languages. In such implementations, an actual translation of the resources or text strings does not need to be done during run time of the application.

In some implementations, text strings located within the code of the application or the computer program may be translated. For example, the text string to be displayed may be as follows.

myTextView.setText("Hello World");
The API may be modified as follows.

```
TextView::setText(String text, Language language, Boolean
autoTranslateWhenNeeded);
```

The parameter "language" may specify the language of the given string. If the language of the string is not specified then a translation service may analyze the string and provide the language. If the language of the string is not the same as the preferred language of the user, the application or computer program may contact a translation service (such as via the Internet) to have the string translated into the preferred language. The string in the preferred language of the user may then be displayed or rendered to the user.

In some implementations, the below pseudocode may be used.

```
String text = "hello world";
String textTranslated = getTranslateService( ).translate(text,
originalLanguage, targetLanguage);
myTextView.setText(textTranslated);
```

In such implementations, the platform of the device exposes the developers of the applications or computer programs to the translation services. The developers of the application or computer programs may use the translation services as desired.

Figure 6:
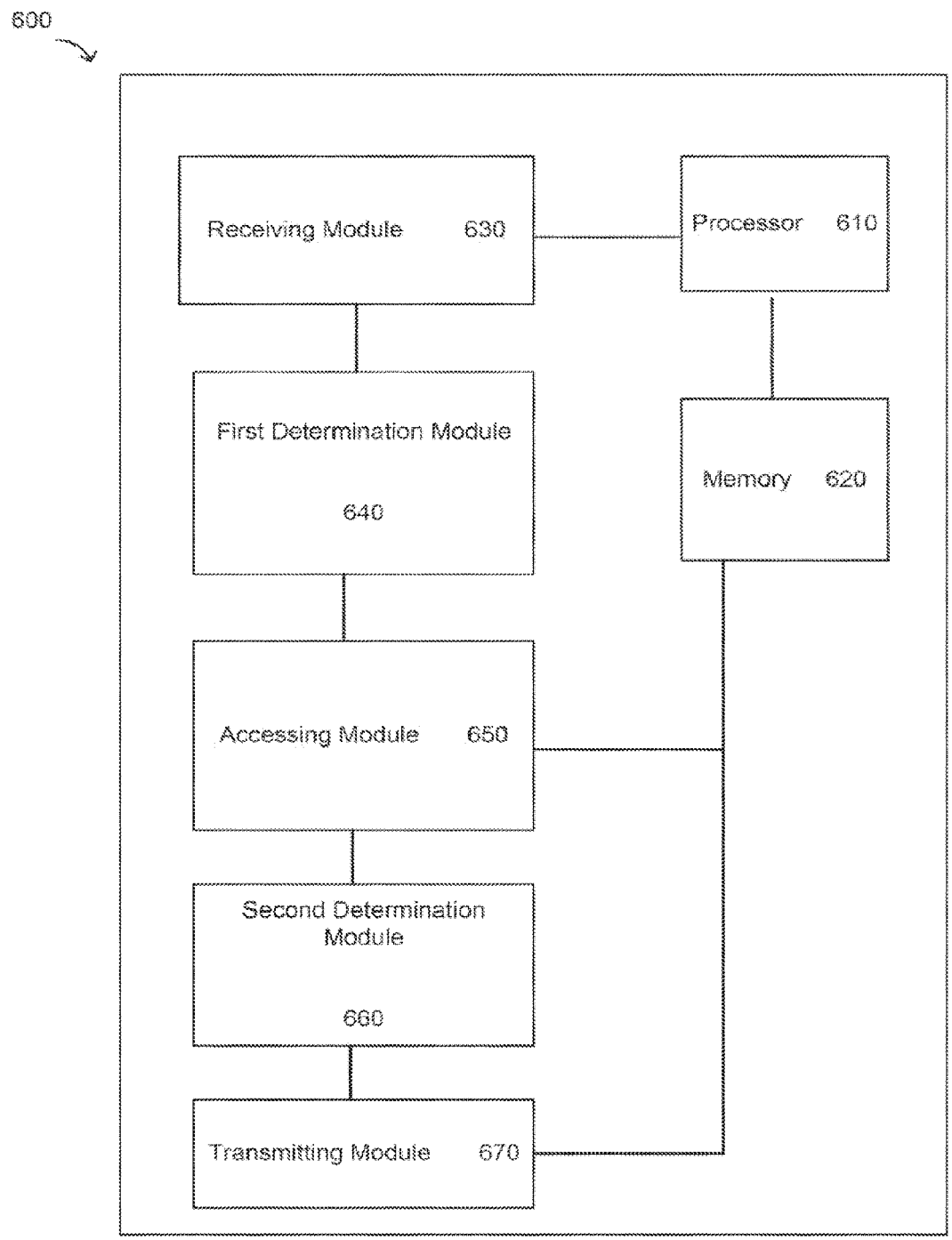
FIG. 6 is a block diagram of a system according to an implementation.

As illustrated in FIG. 6, in some implementations, a system, such as a computer system or computing device, 600 includes a processor 610 and a memory 620. The system also includes a receiving module 630, a first determination module 640, an accessing module 650, a second determination module 660, and a transmitting module 670.

The receiving module 630 is configured to receive a request from an application to provide a first word for use by the application. For example, in some implementations, the application may be stored in the memory 620. The application may be requesting the word so that the word may be displayed or presented to a user of the system or device 600. In some implementations, the application is published or distributed or otherwise provided to the device 600 by an entity. The application may be associated with resources, such as text files or code, such as compiled code, that are stored in the memory 620. The first word requested by the application may be a word that is located in or associated with one of the resources. In some implementations, the resources are also published or distributed by the entity that provided the application.

The receiving module 630 is operatively coupled to the first determination module 640. The first determination module 640 is configured to determine the default language of the system or computing device 600. In some implementations, the first determination module 640 is configured to identify the default language via a setting in the device or system 600. In other implementations, the first determination module 640 is configured provide a query to a user of the device 600 to determine the default or preferred language.

The accessing module 650 is configured to access the resources of the application. The resources may be located in compiled code or stored in text type files. The second determination module 660 is configured to determine whether the resources of the application include the word or words in the default or preferred language.

If the word or words of the resources are in the preferred or default language, then the transmitting module 670 is configured to transmit the word or words to the application.

If the word or words of the resource are not in the preferred or default language, then the transmitting module 670 is configured to provide the translation of the word or words to the application. In some implementations, the transmitting module 670 is configured to transmit the word or words and an indication of the default or preferred language to a translation server, such as a translation server or service that is publicly available via the Internet. In such implementations, the transmitting module 670 is also configured to receive the result of the translation and provide such results (the translated word or words) to the application.

Figure 7:
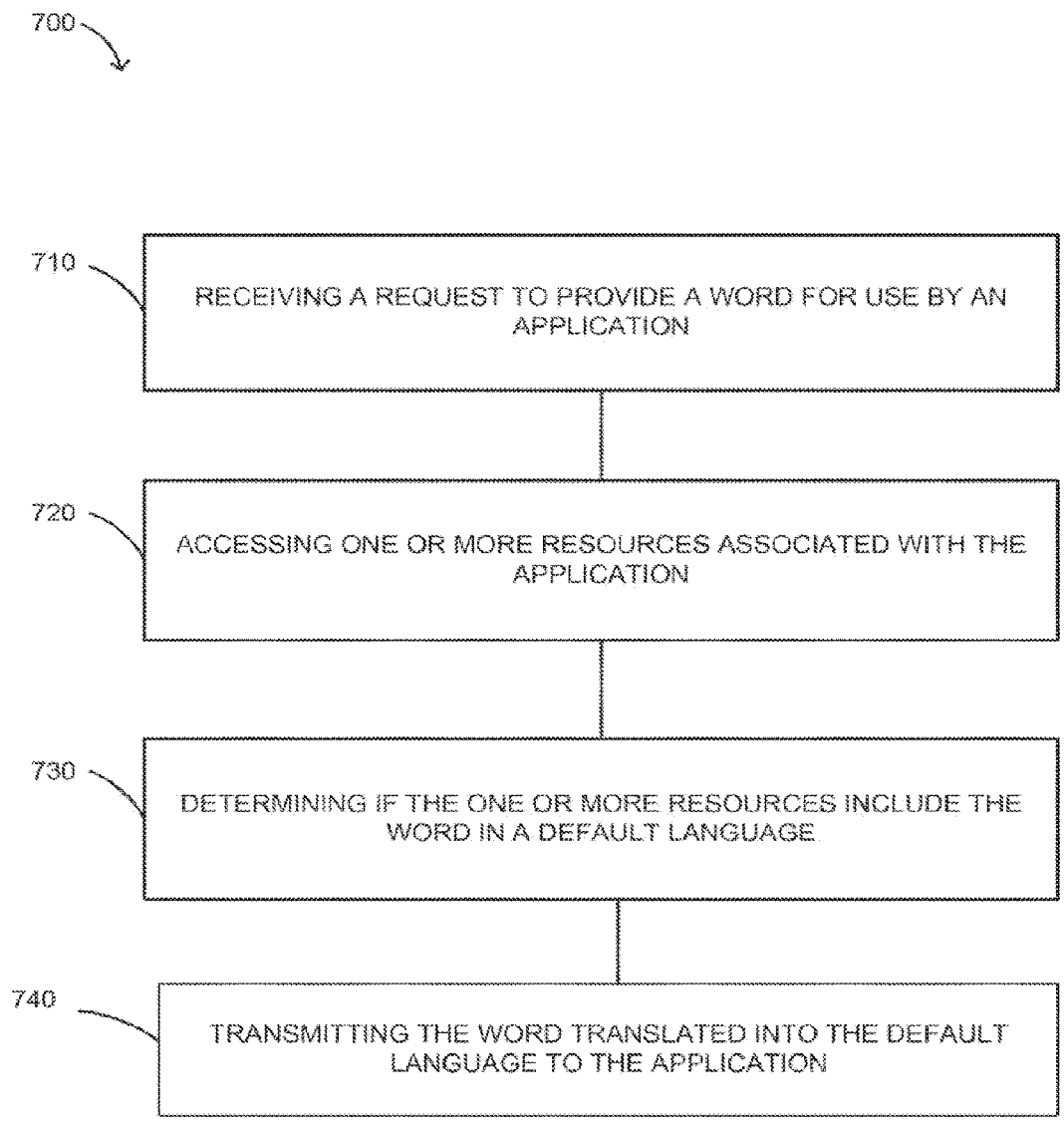
FIG. 7 is a flowchart illustrating example operations of a computer program product according to an implementation.

FIG. 7 is a flow chart of a method 700 according to an implementation. The method 700 may be performed by a computing device that includes at least one processor and a memory. The method 700 includes at 710 receiving a request to provide a word for use by an application. In some implementations, the application is being executed on the processor of the device. The application is published or distributed by an entity and is associated with resources, such as compiled code or text files, that are also published or provided by the entity. In some implementations, the resources associated with the application are stored in the memory of the device 700.

At 720, the one or more resources that include the requested word is accessed in the memory of the device. At 730, it is determined whether the requested word is in a default language or preferred language of the device. In some implementations, this determination includes determining the default or preferred language of the device. For example, in some implementations, the method includes providing a query to a user of the device to request or determine the default or preferred language of the device (or user of the device).

At 740, the word is transmitted or provided to the application. In some implementations, if the word is in the default language of the device, then the word is provided to the application. In some implementations, if the word is not in the default language, then the word is translated into the default language and that word (a second word) is provided to the application. In some implementations, the method 700 includes transmitting the first word and an indication of the default language to a translation server or service. For example, a the first word and an indication of the default language may be provided to a translation service via the Internet. In such implementations, the method 700 also includes receiving from the translation service or sever the second word (the results of the first word being translated to the default language), and providing the second word to the application.

Figure 8:
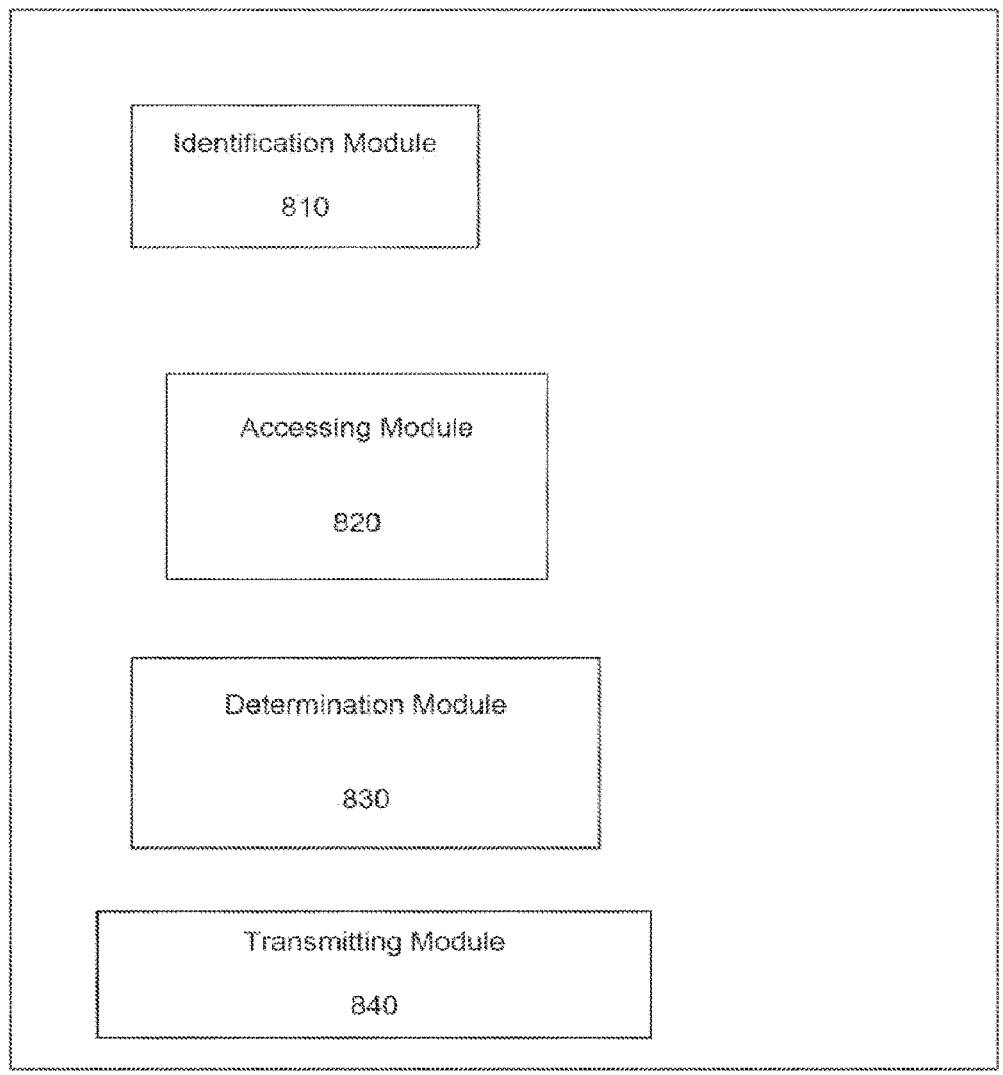
FIG. 8 is a block diagram of a system according to an implementation.

As illustrated in FIG. 8, in some implementations, a system or computing device 800 includes an identification module 810, an accessing module 820, a determination module 830, and a transmitting module 840. In some implementations, the system 800 may also include one or more processors and one or more memories.

The identification module 810 is configured to identify a default or preferred language of an application that is executing on the device 800. In some implementations, the application utilizes a word or words. For example, the application may communicate with a user of the device 800 by displaying a word or words on a display of the device. The word or words may be located in code of the application or they may be located and stored in other resources used by the application, such as text files.

The accessing module 820 is configured access the one or more resources used by the application that is being executed on the device 800. The determination module 830 is configured to determine whether the word or words are in the default or preferred language of the device 800. If the word or words are not in the default or preferred language, the transmitting module 840 is configured to transmit the word or words and an indication of the preferred language. For example, in some implementations, the word or words and the preferred or default language may be transmitted to a system, such as a computing system, that is configured to translate the word or words to the preferred or default language. In some implementations, the word in the preferred language is stored in a memory or cache of the computing device.

In some implementations, the system 800 is configured to determine whether the word or words should be automatically translated into the preferred language.

Figure 9:
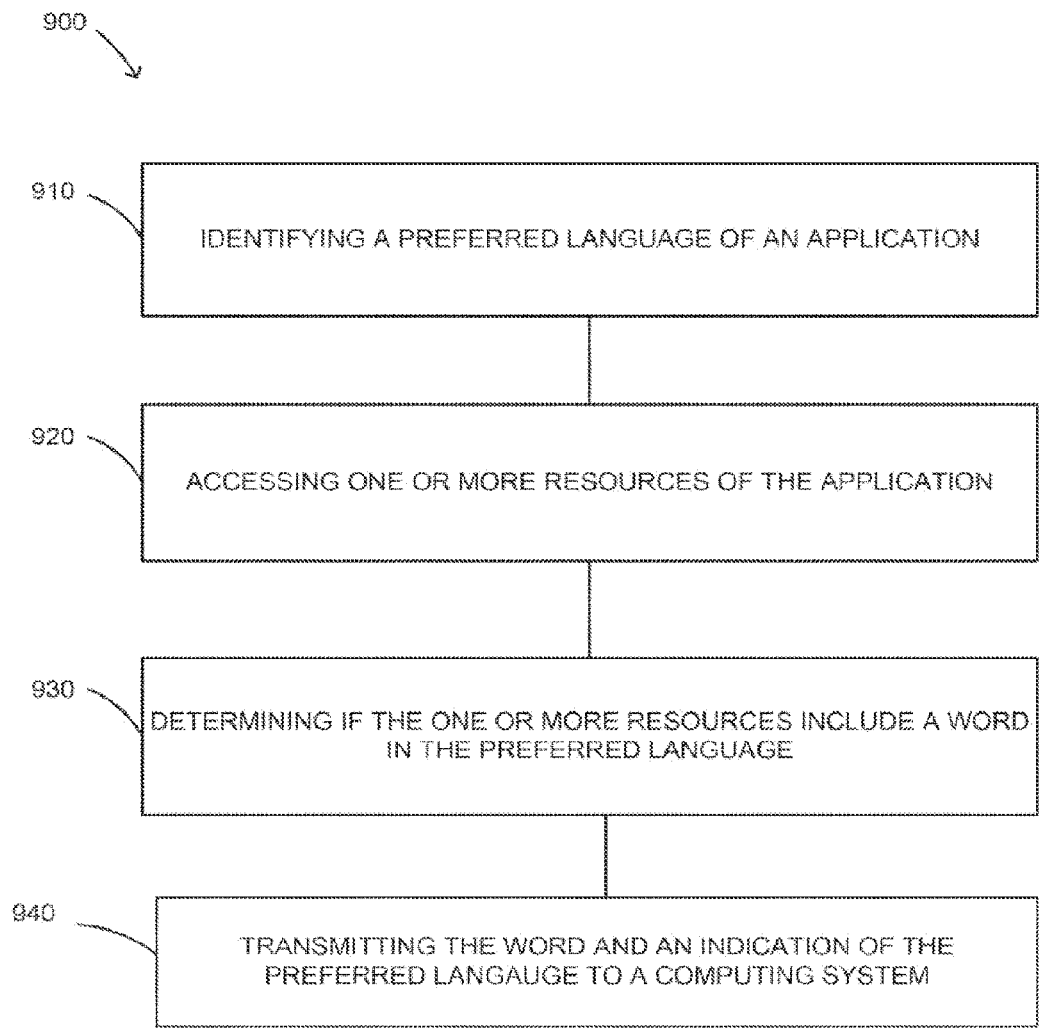
FIG. 9 is a flowchart illustrating example operations of a computer program product according to an implementation.

FIG. 9 is a flow chart of a method 900 according to an implementation. The method 900 may be performed by a computing device. The method 900 includes at 910, identifying a preferred language of an application executing on the computing device. In some implementations, the application utilizes a word. For example, in some implementations, the application utilizes a word to communicate with a user of the computing device (for example, by displaying the word to the user of the computing device).

In some implementations, the application is associated with one or more resources. The one or more resources may include the word or words that are utilized by the application. For example, in some implementations, the one or more resources are compiled code or text files stored in a memory of the device. At 920, the one or more resources of the application are accessed.

At 930, a determination is made as to whether the one or more resources include the word in the preferred language of the user or of the device. In some implementations, the method includes providing a query to the user to determine the preferred language.

At 940, the word and an indication of the preferred language are provided to a computing system. In some implementations, the word and the indication of the preferred language are provided to allow for a translation of the word into the preferred language. In some implementations, the computing system is a local computing system. In other implementations, the computing system is a remote computing system and the word and the indication of the preferred language may be transmitted via the Internet.

In some implementations, the method 900 includes determining whether a memory or a cache of the computing system includes the word in the preferred language.

In some implementations, the translation of the text or text strings to be displayed to a user of the device may be done at the time of compiling, the time of release, the time of download, or the time of management.

In some implementations, the translation of the text is done at the time of compiling. A developer of an application or computer program may provide the default resource and its language information. When the code is compiled, the developer can specify several languages. The compiler can then automatically translate the default resource into the specified languages and package them into the binary so that when a user with a preferred language that matches a target language uses the application, the application provides or displays to the user the text in the preferred language of the user. In such an implementation, a network connection is not required at runtime.

In some implementations, the translation of the text is done at the time of release. Similar to the above, the developer may specify the target languages when the application or computer program is released to the market. In such an implementation, the extra resource package may be signed by a market holder instead of the developer.

In some implementations, the translation of the text or strings of text may be translated at the time an application or computer program is downloaded by a user. For example, when a user downloads an application or computer program, the marketplace or marketplace provider can detect whether the user's preferred language is natively supported by the application. If the preferred language of the user is not supported by the application, the marketplace or marketplace provider can prompt the user that the application can be translated to his language (or more languages can be specified). The user may then accept the suggestion and the related resources will be downloaded or translated into the preferred language of the user and downloaded.

Figure 10:
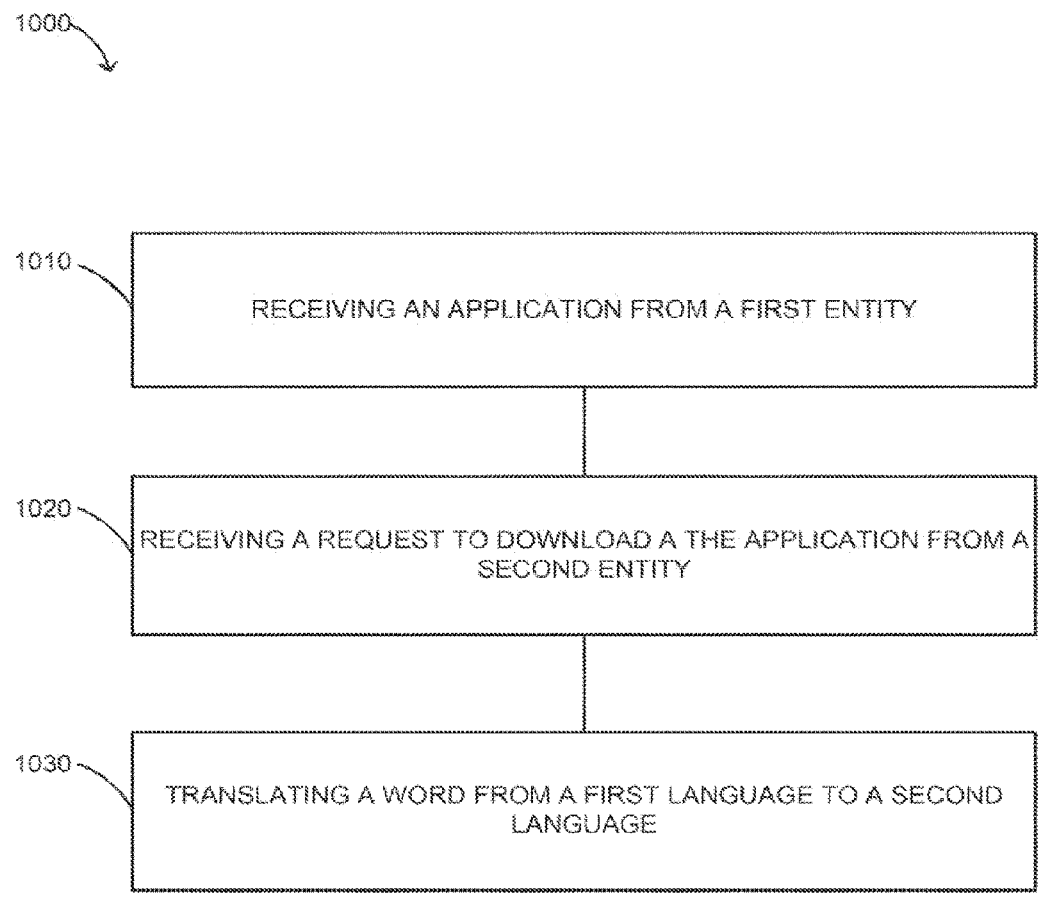
FIG. 10 is a flowchart illustrating example operations of a computer program product according to an implementation.

FIG. 10 is a flow chart of a method 1000 according to an implementation. The method 1000 may be performed on computing device that has one or more processors and one or more memories. The method includes, at 1010, receiving an application to be run on a computing device from a first entity. For example, a computing system may include a receiving module that is configured to receive the application from the first entity. In some implementations, the application includes at least one resource that has a word in a first language. In some implementations, the resource may be compiled code. In other implementations, the resource may be a text file. In some implementations, the application uses the word to communicate with a user of the application.

At 1010, a request is received from a second entity to download the application. For example, the second entity may be a different entity or individual than the first entity. The second entity has a preferred language, such as the primary language spoken or understood by the second entity.

In some implementations, the computing system includes a second receiving module configured to receive the request from the second entity. The second receiving module may be a component of a marketplace that is configured to provide or distribute application to consumers.

At 1020, the word is translated from the first language to the preferred language. In some implementations, the method includes translating the word from the first language to the second language locally. For example, translation software may be executed on the computing device to translate the word from the first language to the preferred language. In other implementations, the word and an indication of the preferred language may be transmitted to a translation service or server, such as via the Internet.

In some implementations, the method 1000 includes providing a query to a user to the second entity to determine whether the word should be translated into the preferred language.

In some implementations, the text or text strings may be translated at management time. For example, as discussed above with respect to the translation at compiling time, an application manager or provider, can specify a target language (or more than one language) for an application. The application manager or provider may request that the text or text strings be translated offline. In such an implementation, the translation is not done at runtime.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method performed by a computing device having at least one processor and a memory, the method comprising:
    receiving, from an application being executed by the at least one processor, a request to provide a first word for use by the application;
    determining a default language of the computing device;
    accessing, in the memory of the computing device, one or more resources;
    determining if the one or more resources include the first word in the default language by iteratively eliminating, based on identified qualifiers, resource directories for the one or more resources until only one resource directory remains, the one resource directory excluding resource files that contradict a configuration of the computing device;
    if the one or more resources include the first word in the default language, then providing, from the one resource directory, the first word to the application; and
    if the one or more resources do not include the first word in the default language, then:
        transmitting the first word and an indication of the default language to a translation server;

receiving from the translation server a second word obtained by translating the first word into the default language; and providing the second word to the application.

2. The method of claim 1, wherein the one or more resources include resources stored as text files.

3. The method of claim 1, wherein the accessing, in the memory of the computing device, the one or more resources includes accessing, in the memory of the computing device, one or more resources stored as text files.

4. The method of claim 1, wherein the one or more resources include resources stored within a compiled code.

5. The method of claim 1, wherein the accessing, in the memory of the computing device, the one or more resources includes accessing, in the memory of the computing device, one or more resources stored within a compiled code.

6. The method of claim 1, wherein the default language is a preferred language of a user of the computing device.

7. The method of claim 1, wherein the determining the default language of the computing device includes providing a query to a user of the computing device to identify the default language of the computing device.

8. The method of claim 1, wherein the determining the default language of the computing device includes identifying the default language from a setting of the computer device.

9. A computing device having at least one processor and a memory, comprising:
    a receiving module configured to receive a request from an application to provide a first word for use by the application;
    a first determination module configured to determine a default language of the computing device;
    an accessing module configured to access one or more resources stored in the memory;
    a second determination module configured to determine if the one or more resources include the first word in the default language by iteratively eliminating, based on identified qualifiers, resource directories for the one or more resources until only one resource directory remains, the one resource directory excluding resource files that contradict a configuration of the computing device; and
    a transmitting module, the transmitting module configured to transmit the first word in the default language to the application if the one or more resources include the first word in the default language, the transmitting module configured to transmit the first word and an indication of the default language to a translation server, receive from the translation server a second word obtained by translating the first word into the default language, and transmit the second word to the application.

10. The computing device of claim 9, wherein the one or more resources include resources stored as text files.

11. The computing device of claim 9, wherein the one or more resources include resources stored within a compiled code.

12. The computing device of claim 9, wherein the default language is a preferred language of a user of the computing device.

13. The computing device of claim 9, wherein the first determination module includes a query module configured to provide a query to a user of the computing device to identify the default language of the computing device.

14. The computing device of claim 9, wherein the accessing module is configured to access the one or more resources by accessing one or more resources stored as text files.

15. The computing device of claim 9, wherein the accessing module is configured to access the one or more resources by accessing one or more resources stored within a compiled code.

16. The computing device of claim 9, wherein the first determination module is configured to determine the default language of the computing device by identifying the default language from a setting of the computer device.

17. A computer program product tangibly embodied on a non-transitory computer readable medium and comprising instructions that, if executed, cause at least one processor of a computing device to:
    receive, from an application being executed by the at least one processor, a request to provide a first word for use by the application;
    determine a default language of the computing device;
    access, in a memory of the computing device, one or more resources;
    determine if the one or more resources include the first word in the default language by iteratively eliminating, based on identified qualifiers, resource directories for the one or more resources until only one resource directory remains, the one resource directory excluding resource files that contradict a configuration of the computing device;
    if the one or more resources include the first word in the default language, then provide, from the one resource directory, the first word to the application; and
    if the one or more resources do not include the first word in the default language, then:
        transmit the first word and an indication of the default language to a translation server;
        receive from the translation server a second word obtained by translating the first word into the default language; and
        provide the second word to the application.

18. The computer program product of claim 17, wherein the one or more resources include resources stored as text files.

19. The computer program product of claim 17, wherein the one or more resources include resources stored within a compiled code.

20. The computer program product of claim 17, wherein the default language is a preferred language of a user of the computing device.

21. The computer program product of claim 17, further comprising instructions that, if executed, cause the at least one processor to provide a query to a user of the computing device to identify the default language of the computing device.

22. The computer program product of claim 17, wherein the instructions that, if executed, cause the at least one processor to access the one or more resources include instructions that, if executed, cause the at least one processor to access, in the memory of the computing device, one or more resources stored as text files.

23. The computer program product of claim 17, wherein the instructions that, if executed, cause the at least one processor of the computing device to access, in the memory of the computing device, the one or more resources include instructions that, if executed, cause the at least one processor to access, in the memory of the computing device, one or more resources stored within a compiled code.

24. The computer program product of claim 17, wherein the instructions that, if executed, cause the at least one processor of the computing device to determine the default language of the computing device by identifying the default language from a setting of the computer device.

* * * * *